Dec. 2, 1952     W. L. KRAMER     2,620,249
FILING CASE AND SEQUENTIAL EXTRACTOR MEANS
FOR PHOTO SLIDES, CARDS, AND THE LIKE
Filed March 23, 1951     2 SHEETS—SHEET 1
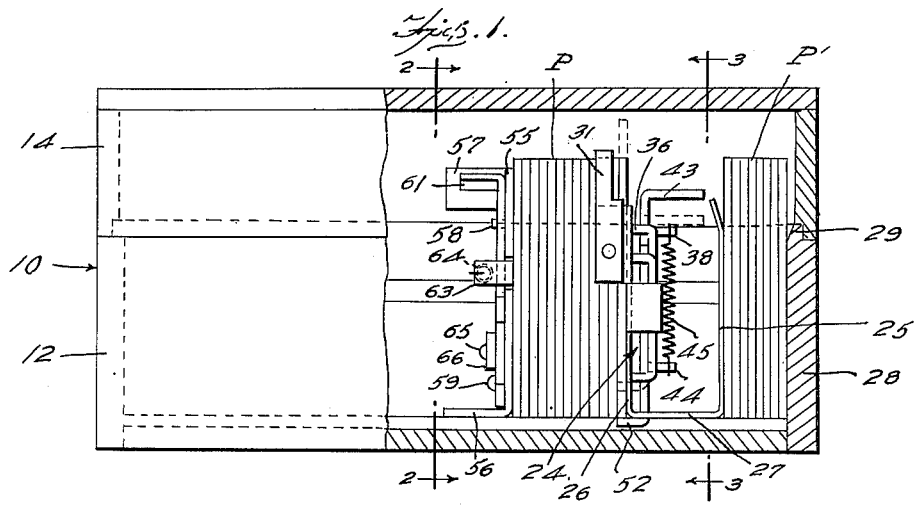
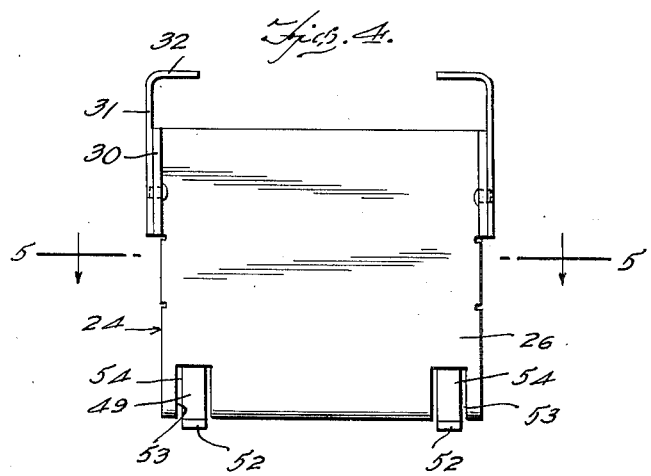
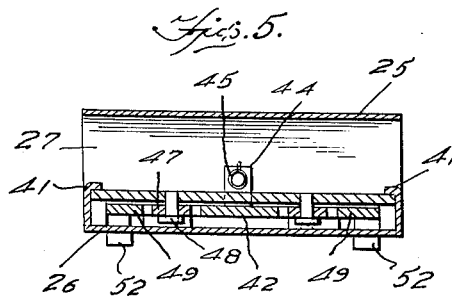
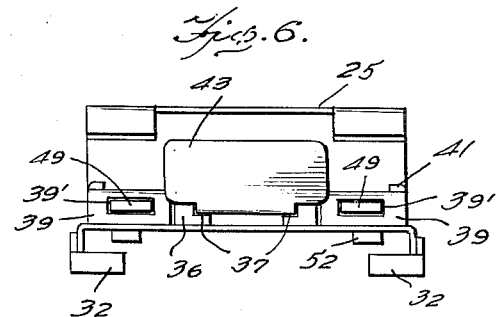
INVENTOR.
William L. Kramer
BY
Wilfred E. Lawson
ATTORNEY Dec. 2, 1952 W. L. KRAMER 2,620,249
FILING CASE AND SEQUENTIAL EXTRACTOR MEANS
FOR PHOTO SLIDES, CARDS, AND THE LIKE
Filed March 23, 1951 2 SHEETS—SHEET 2
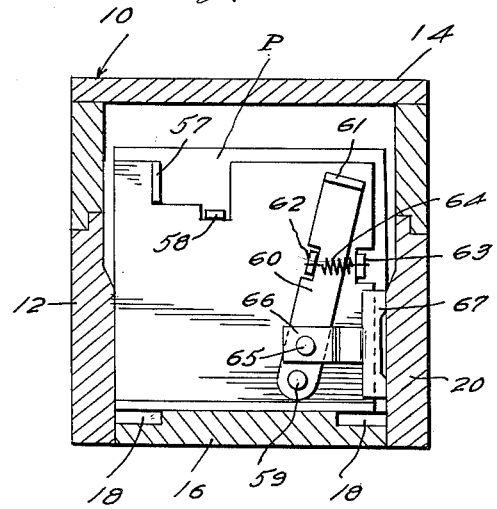
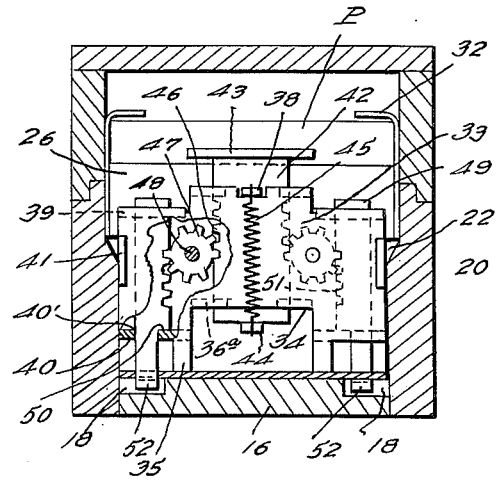
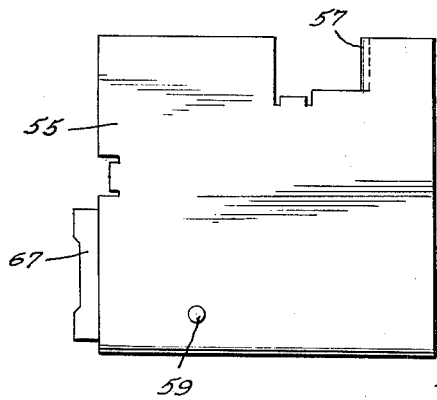
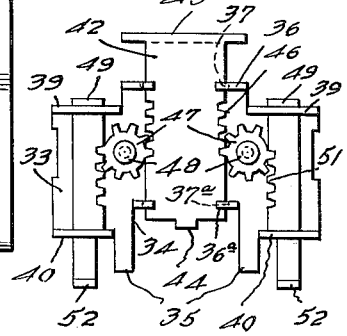
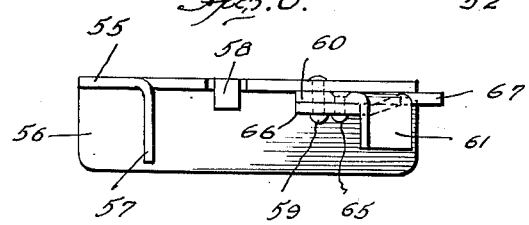
INVENTOR.
William L. Kramer
BY
ATTORNEY Patented Dec. 2, 1952

2,620,249

UNITED STATES PATENT OFFICE 2,620,249

FILING CASE AND SEQUENTIAL EXTRACTOR MEANS FOR PHOTO SLIDES, CARDS, AND THE LIKE

William L. Kramer, Los Angeles, Calif.

Application March 23, 1951, Serial No. 217,158

6 Claims. (Cl. 312—55)

This invention relates generally to filing apparatus and is directed particularly to an improved filing case and sequential extractor means for photo slides, cards and the like.

An object of the present invention is to provide a filing case for those flat objects which must be withdrawn singly and in a desired sequence such as photograph slides as used in projecting machines, wherein means is provided for maintaining the slides in compact order in the case and for shifting the slides one at a time from the front end of the group whereby such slides can be withdrawn in the desired sequence for use.

Another object of the invention is to provide in a filing case and extractor means of the character stated, a novel means whereby the withdrawn slides may be returned to the case in a prescribed order so that after all have been withdrawn sequentially and used they will be restored in the same order and ready for repeated use.

Another and more specific object of the invention is to provide in a filing case of the character stated, an extractor means which is mounted in the case across the front of a group of the slides and provided with a finger actuated plunger which operates a pair of lifter feet to engage the bottom of the foremost slide and elevate it to a position where it can be conveniently grasped and removed from the case.

Another object of the invention is to provide a photo slide and card holding casing with means for removing one slide or card at a time, comprising a vertically reciprocable actuator element and a pair of vertically movable lifter elements between which the actuator is positioned, which lifter elements have angularly turned feet engaging under the edge of the foremost slide or card of a group, and a power transmitting mechanism between the actuator and the lifter elements whereby upon depression of the actuator the lifter elements will be elevated a predetermined distance to lift the foremost slide or card into position ready for removal.

Still another object of the invention is to provide in mechanism of the above described character, a means forming a part of the card lifting mechanism and positioned in advance thereof for holding in place slides or cards which have been used and are replaced in the case, which replacement of the used slide or card moves the actuating mechanism back into position with respect to the slides or cards to be removed, ready for the extraction of the next single slide or card.

Other objects and advantages of the invention will become apparent as the description of the same proceeds and the invention will be best understood from a consideration of the following detailed description taken in connection with the accompanying drawings forming a part of the specification with the understanding, however, that the invention is not to be limited to the exact details of construction shown and described since obvious modifications will occur to a person skilled in the art.

In the drawings:

Figure 1 is a view partly in longitudinal section of a filing case showing in elevation therein the mechanism comprising, with features of the case construction, the present invention and also showing two groups of slides or cards in the case.

Figure 2 is a transverse section taken substantially on the line 2—2 of Figure 1.

Figure 3 is a transverse section taken substantially on the line 3—3 of Figure 1 with parts of the mechanism broken away showing details of construction.

Figure 4 is a view looking toward the back of the complete slide or card extraction unit.

Figure 5 is a transverse section taken substantially on the line 5—5 of Figure 4.

Figure 6 is a view in top plan of the card shifting unit removed from the case.

Figure 7 is a view in front elevation of the follower, which is shown in rear elevation in Figure 2.

Figure 8 is a view in top plan of the follower.

Figure 9 is a view of the elevating mechanism per se as seen from the rear side.

Referring now more particularly to the drawings the numeral 10 generally designates the photo slide or card case which comprises the bottom section 12 and the top section or cover 14.

As shown most clearly in Figures 2 and 3 the bottom or floor 16 of the case is provided at each side with the longitudinally extending channels 18 and each of the longitudinal side walls 20 is cut back or recessed throughout its length from about half-way up to the top edge of the bottom section as indicated at 22, for the purposes hereinafter set forth.

Adapted to fit snugly within the case and at the same time have free sliding movement lengthwise therein, is the combined slide or card elevating and guard unit which is generally designated 24. This unit comprises a substantially U-shaped frame structure formed preferably from a single sheet of metal of suitable weight to provide a front wall or guard plate 25, a back wall or plate 26 and the intervening bottom or connecting wall 27. When the unit 24 is placed in the case the wall 25 is toward the front end of the case and the back wall 26 opposes the foremost one of the stack of photo slides or plates, designated P. The reference character P' designates those plates or cards which have been extracted by the extractor, used and replaced between the front plate 25 and the front end of the cabinet or case, the front wall 28 being slightly beveled as indicated at 29, at its top edge to facilitate the insertion of the used plates or cards which are held in a group, as shown, between the plate 25 and the front wall.

The upper portion of each vertical side edge of the plate 26 has the two rearwardly turned wings 30 which are disposed outside of the vertical edges from which they extend and connected with each of these wings 30 is an upstanding arm 31 which at its upper end has the inwardly directed guide finger 32. The wing 30 and arm 31 at each side of the unit is located in the offset recess 22 so that they will offer no hindrance to the upward movement of a card against the face of the wall 26. The forward edges of the guide fingers 32, however, are in a plane disposed rearwardly of the card engaging face of the plate 26 a distance substantially equalling or a little greater than the thickness of the card or photo slide so that when such card or slide is elevated as hereinafter described the fingers act as guides for the slide or card.

Positioned in spaced relation with the forward side of the plate 26 is a support plate 33 which has a central bottom recess 34 bordered on each side by a supporting leg 35 which rests upon the horizontal connecting plate 27 of the unit as shown in Figure 3.

Above the recess 34, the top edge of the support plate 33 has the right angular turned flanges 36 which abut against the forward side of the plate 26 as shown in Figure 6 and as is also shown in this figure, each of these flanges has its inner edge notched as at 37 for the purpose hereinafter stated.

Projecting from the top edge of the support plate 33 in the opposite direction from the flanges 36 and at the vertical center of the plate 33, is a lug 38, the purpose of which will be hereinafter described.

Adjacent to each vertical side edge of the support plate 33, the top and bottom edges of such plate are provided with the angularly turned spacing flanges designated 39 and 40 respectively which have formed therethrough the guide slots 39' and 40'. These spacer flanges 39 and 40 bear against the forward face of the plate 26 and, with the flanges 37, serve to maintain the support plate 33 in proper spaced relation from the plate 26 to provide a cover for the hereinafter described moving parts. The plate 33 is held in this position by the rearwardly directed locking flanges 41 which form an integral part of the plate 26 as shown in Figure 5.

At the top edge of the recess 34, adjacent to each side of the recess, there are formed the forwardly directed spacer flanges 36a which correspond with the flanges 36 and which are notched in their opposing edges in the same way as the flanges 36 are notched and positioned against the rear side of the support plate 33 to slide vertically thereacross is an actuator plate 42, the side edges of which engage in and are guided by the notches 37 and 37a of the spacer flanges 36 and 36a.

The top end of the actuator plate 42 carries the flat head or finger piece 43 which projects forwardly as shown in Figure 1 while the lower or bottom edge of the actuator carries the forwardly extending lug 44 which projects through the recess 34 as shown in Figure 3. Connected between the lug 44 and the fixed lug 38 at the top of the plate 33 is the spring 45 which normally tends to elevate the actuator plate or slide it upwardly.

Between the spacing flanges 36 and 36a, the side edges of the actuator plate have gear teeth 46 formed therein which are in mesh with gear pinions 47 rotatably supported at opposite sides of the actuator plate 42, upon the pivot pins 48 which are secured in the support plate 33, as shown in Figure 5.

At the opposite side of each gear pinion 47 from the actuator plate 42, is a toothed rack 49, the upper end of each of which extends through a guide slot 39' in the upper spacing flange 39, while the lower end of the rack, which is of reduced width, extends through the lower guide slot 40' of the adjacent spacer flange 40. By reducing the width of each rack 49 there is provided a stop shoulder 50 which contacts the adjacent lower spacer flange 40 to limit the downward movement of the rack.

The edges of the racks 49 which oppose the pinions 47 are provided with teeth 51 for engagement with the adjacent pinions and as will be readily apparent with the racks and the actuator plate 42 connected in this manner, when the plate 42 is pressed down against the resistance of the spring 45 the pinions 47 will be rotated and the racks will be raised vertically in the case.

The lower end of each rack carries a right angularly extending foot 52 which projects through an opening 53 in the bottom part 27 of the unit into the underlying channel 18. This opening 53 communicates with the vertically extending recess 54 which is formed in the plate 26 as shown in Figure 4 whereby the above stated vertical movement of the foot is permitted.

Cooperating with the plate 26 of the unit 24 is a follower plate 55. This follower plate is of a width to fit snugly in the lower part 12 of the case and at its bottom edge is provided with a wide right angularly directed base flange 56 which rests upon the top of the floor or bottom 16.

The top edge of the plate 55 has a portion 57 cut therefrom and turned back to form a finger rest and there also projects rearwardly from the lower edge of the opening which is formed by cutting out the finger rest member 57, a stop ear 58.

Fixed to the back of the follower plate 55 adjacent to the bottom thereof and also adjacent to the vertical edge remote from the finger rest 57 is a pivot stud 59 upon which is pivotally mounted an upwardly extending lever 60, the top end of which is directed rearwardly at an angle as indicated at 61, to provide the means for engaging the lever with the finger so that the lever may be oscillated toward the stop lug 58. Connected between the lugs 62 and 63 carried respectively by the lever 60 and the adjacent vertical edge of the plate 55, is a spring 64 which pulls the lever over toward the adjacent vertical edge of the plate.

Adjacent to its lower pivoted end, the lever 60 carries a pivot pin 65 on which is oscillatably supported an end of an arm 66, the other end of the arm carrying a relatively long jaw 67 which has its outer edge directed toward the adjacent side wall 20 of the case. Thus it will be seen that when the follower plate 55 is positioned within the lower part of the case to extend transversely thereof, the spring 64 will pull the lever in a direction to force the edge of the clamping jaw 67 against the adjacent side wall 29, forcing the opposite edge of the plate 55 against the other side wall and thus securing the follower plate in position. The follower plate will, of course, be pulled forwardly against the rear of the stack of slides so as to maintain such stack in proper position with respect to the plate 26 of the extractor unit.

In the use of the present mechanism, when a stack of the photo slides P is in position in the case between the plates 26 and 55, the slides can be withdrawn in the order in which they are arranged, starting from the front one, by pressing down on the headpiece 43 of the actuator plate 42, thereby rotating the pinions as previously described to effect the upward movement of the racks 49, which movement will cause the feet 52 to engage the bottom edge of the foremost slide and shift it upwardly.

As the slides are used they are replaced in the case between the forward plate 25 of the unit and the forward end wall 28 of the case as shown in Figure 1 where the reference character P' designates the used and replaced slides.

I claim:

1. A device of the character set forth comprising a long case for flat articles such as photo slides, cards and the like, said case having a horizontal bottom wall provided with spaced, longitudinal channels, an upright unit in the case comprising a vertical plate having an angular bottom part resting on said case bottom wall for sliding movement thereon longitudinally of the channels, a pair of article elevating elements slidably supported on said plate for vertical movement, each element including an angular bottom foot, the plate and bottom part having openings for said feet and the feet extending through the openings into said channels and projecting beyond a face of the plate to engage beneath the bottom edge of an article lying against said face, and means carried by the plate for reciprocal movement and operatively coupled with and between the elevating elements for effecting the shifting of the latter.

2. A device of the character set forth comprising a long case for flat articles such as photo slides, cards and the like, said case having a bottom provided with spaced, longitudinal channels, an upright unit in the case comprising a vertical plate having an angular bottom part resting on said case bottom, a pair of article elevating elements slidably supported on said plate for vertical movement, each element including an angular bottom foot, the plate and bottom part having openings for said feet and the feet extending through the openings into said channels and projecting beyond a face of the plate to engage beneath the bottom edge of an article lying against said face, means carried by the plate and operatively coupled with the elevating elements for shifting the latter, said means includes a flat elongate plate slidably positioned against the face of the first plate opposite from the article to be elevated and extending above the top of the first plate, a head upon the top of said elongate plate, and said operative coupling comprises a gear pinion rotatably supported on the first plate between each elevating element and an edge of the second mentioned plate and teeth carried by each element and the second mentioned plate with which the interposed pinion meshes.

3. A device of the character set forth comprising a long case for flat articles such as photo slides, cards and the like, said case having a bottom provided with spaced, longitudinal channels, an upright unit in the case comprising a vertical plate having an angular bottom part resting on said case bottom, a support plate disposed in front of the first plate and having top and bottom spacer flanges adjacent to each side edge in contact with the first plate, means securing the two plates together, said spacer flanges having guide slots therein, a pair of long flat article elevating elements between said plates and each slidably extended through the slots of two vertically spaced flanges, said angular bottom part having an opening below each element joining a vertical slot in the first plate, each element having an angularly directed article lifter foot on its lower end extending through an opening into a channel and projecting beyond the face of the first plate against which an article is positioned, a vertically disposed actuator positioned between said plates, means on the support plate holding said actuator in position for vertical movement, spring means urging the actuator upwardly, and an operative coupling between the actuator and said elements functioning to move the elements upwardly upon downward movement of the actuator.

4. The invention as set forth in claim 3, wherein said operative coupling comprises a gear pinion pivotally supported between said plates between each element and a side of said actuator, and gear teeth carried by each side of the actuator and by each element for engagement by the pinions.

5. The invention as set forth in claim 3, wherein said unit further includes an upright, resilient guard plate joined to said angular bottom part and spaced forwardly from said support plate.

6. The invention as set forth in claim 3, in combination with a follower plate disposed uprightly in the case rearwardly of the first plate and carrying means for clamping it in set position between the sides of the case.

WILLIAM L. KRAMER.

REFERENCES CITED

The following references are of record in the file of this patent:

UNITED STATES PATENTS

| Number | Name | Date |
|---|---|---|
| 1,170,705 | Swift | Feb. 8, 1916 |
| 1,504,643 | Nudl | Aug. 12, 1924 |
| 2,201,272 | Salzbrenner | May 21, 1940 |
| 2,258,984 | Graves | Oct. 14, 1941 |
| 2,275,819 | Hood | Mar. 10, 1942 |

FOREIGN PATENTS

| Number | Country | Date |
|---|---|---|
| 25,805 | Germany | Sept. 25, 1906 |
| 192,417 | Germany | Nov. 28, 1907 |